United States Patent
Wald (10) Patent No.: US 7,515,996 B2
(45) Date of Patent: Apr. 7, 2009

(54) METHOD AND APPARATUS FOR MONITORING AND CONTROLLING THE THERMAL ENVIRONMENT AND OPERATING CONDITIONS OF AN INTEGRATED CIRCUIT

(75) Inventor: Steven F. Wald, Meridian, ID (US)

(73) Assignee: Avago Technologies General IP (Singapore) Pte. Ltd.

( * ) Notice: Subject to any disclaimer, the term of this patent is extended or adjusted under 35 U.S.C. 154(b) by 464 days.

(21) Appl. No.: 11/222,005

(22) Filed: Sep. 8, 2005

(65) Prior Publication Data

US 2007/0052453 A1    Mar. 8, 2007

(51) Int. Cl.
    G05D 23/00    (2006.01)
(52) U.S. Cl. .................... 700/300; 700/50; 713/322
(58) Field of Classification Search .......... 700/9, 700/153, 151, 143, 50, 300; 713/322
    See application file for complete search history.

(56) References Cited

U.S. PATENT DOCUMENTS

| | | | | |
|---|---|---|---|---|
| 5,959,487 | A * | 9/1999 | Kawamura | 327/270 |
| 6,608,791 | B2 * | 8/2003 | Watanabe et al. | 365/211 |
| 7,171,542 | B1 * | 1/2007 | Alfano et al. | 712/38 |
| 2005/0219935 | A1 * | 10/2005 | Watanabe et al. | 365/230.06 |
| 2006/0167657 | A1 * | 7/2006 | Naffziger et al. | 702/182 |

OTHER PUBLICATIONS

Author Name Unknown; "Powerwise Technology"; May 2004; National Semiconductor Corporation & ARM Limited; pp. 1-4; Santa Clara, California, USA; powerwise.national.com.

Author Name Unknown; "PWI Open Standard for Next-Generation Power Management"; Publication Date Unknown; National Semiconductor Corporation & ARM Limited; pp. 1-2; Santa Clara, California, USA; Cambridge, United Kingdom; powerwise.national.com.

Mark Hartman et al.; "On-Chip Power Management Utilizing an Embedded Hardware Controller and a Low-Power Serial Interface"; Publication Date Unknown; National Semiconductor Corp.; pp. 1-10; Longmont, Colorado, USA.

Mark Hartman; "Powerwise Adaptive Voltage Scaling Minimizes Energy Consumption"; Publication Date Unknown; National Semiconductor Corp.; pp. 1-5; USA.

Ravi Ambatipudi; "CPU-Monitoring Loop Eyes System Power"; May 2, 2003; pp. 1-4; EE Times; USA; www.eetimes.com/story/OEG20030502S0035.

Ravindra Ambatipudi; "Powering Next Generation Mobile Devices"; Publication Date Unknown; National Semiconductor Corp.; pp. 1-4; USA.

Ravindra Ambatipudi; "Powering Next Generation Mobile Devices"; Publication Date Unknown; National Semiconductor Corp.; pp. 1-5; USA.

Dennis Monticelli; "System Approaches to Power Management"; Publication Date Unknown; National Semiconductor; pp. 1-4; Santa Clara, California, USA.

* cited by examiner

Primary Examiner—Ryan A Jarrett (57) ABSTRACT

Logic included in an IC monitors values of parameters that may affect operation of the IC, such as, for example, supply voltage ($V_{DD}$), junction temperature ($T_{JUNC}$) and the frequency of a ring oscillator on the IC. In response to the monitored values, the logic in the IC changes, if necessary, one or more parameters such as $V_{DD}$, processor frequency ($F_{CLK}$), and/or cooling level to control the performance of the IC. Thus, the IC monitors its own environment and operating conditions and takes appropriate steps to control its environment and operating conditions to achieve certain goals.

24 Claims, 6 Drawing Sheets

INPUTS

T$_{JUNC}$

MAX  HOT  NORMAL  COLD

Processor Demand

CRITICAL  NORMAL  LOW  NONE

V$_{DD}$

MAX (+10%)  NOMINAL  MIN (-10%)

CONTROLS

V$_{CTRL}$

MAX  NOMINAL  MIN

F$_{CLK}$

MAX  HIGH  LOW  MIN

Cooling Level

HIGH  MEDIUM  LOW  OFF

METHOD AND APPARATUS FOR MONITORING AND CONTROLLING THE THERMAL ENVIRONMENT AND OPERATING CONDITIONS OF AN INTEGRATED CIRCUIT

BACKGROUND OF THE INVENTION

The performance of an integrated circuit (IC) typically depends on several parameters that influence the speed at which the IC operates. Three such parameters of the IC are its supply voltage, operating temperature, and the thickness of the transistor-gate oxides. Variations in these parameters from respective nominal values may affect the delay time of signals that propagate within the IC, and thus, may vary the operating speed of the IC from a nominal speed. For example, if the voltage supply is lower than the nominal value, logic gates within the IC may operate more slowly because the rise times between logic 0 and logic 1 are longer due to the lower drive signal strength. Similarly, as the temperature of the IC decreases, logic circuits within the IC operate more quickly due to the increased mobility of carriers in the transistors. In addition, the thinner the gate-oxides, the faster the transistors, and thus, the faster the logic circuits of the IC. Conversely, the higher the supply voltage, the more quickly the logic gates operate, and the higher the temperature or the thicker the gate-oxides, the more slowly the logic gates operate.

Because these parameters may vary, the IC manufacturer typically accommodates these variations by predicting a best-case scenario and a worst-case scenario and designing the IC for a nominal case that is between the best- and worst-case scenarios. In a best-case scenario, the voltage supply is at its highest rated level, the IC operates at its lowest rated temperature, and the manufacturing process parameters (e.g., gate-oxide thickness) have their "fastest" values, such that the IC operates at its highest speed. Conversely, in the worst-case scenario, the voltage supply is at its lowest rated level, the temperature of the IC is at its highest rated value, and the manufacturing-process parameters have their "slowest" values, such that the IC operates at its slowest speed. By predicting the worst-case parameter values, an engineer can typically design an IC to operate adequately even under worst-case conditions.

However, it is becoming more difficult to design an IC to operate properly over the wide range of worst-case and best-case conditions, and soon may not be feasible. As ICs become increasingly dense (i.e., more transistors per unit area), there is more available area in which to include new forms of compensation circuitry. Supply voltage and temperature are currently controlled by circuits or devices that are external to the IC. IC process characteristics are typically universally ignored, except at the time of the original manufacturing tests.

Accordingly, a need exists for a way to more accurately compensate for the affect that parameter variations have on the operation of an IC.

SUMMARY OF THE INVENTION

The invention provides a method and an apparatus for monitoring and controlling environmental and operating conditions of an integrated circuit (IC) in which the apparatus is located. Supply voltage measurement logic of the apparatus measures the supply voltage of the IC. Process speed measurement logic of the apparatus measures the process speed of the IC. Temperature measurement logic of the apparatus measures the temperature of the IC. Processing logic of the apparatus receives respective indications of the supply voltage, the process speed and the temperature from the measurement logic and processes the indications to generate a supply voltage control signal, a process speed control signal, and a temperature control signal. Supply voltage control logic of the apparatus controls the supply voltage of the IC in response to receiving the supply voltage control signal from the processing logic. Process speed control logic of the apparatus controls the process speed of the IC in response to receiving the process speed control signal from the processing logic. Temperature control logic of the apparatus controls the temperature of the IC in response to receiving the temperature control signal from the processing logic.

The method involves using supply voltage measurement logic, process speed measurement logic and the temperature measurement logic on the IC to measure the supply voltage, the process speed and the temperature of the IC, respectively. Indications of the supply voltage, the process speed and the temperature are received in processing logic of the IC and processed by the processing logic to generate a supply voltage control signal, a process speed control signal, and a temperature control signal. Supply voltage control logic on the IC is used to control the supply voltage of the IC in response to receiving the supply voltage control signal in the supply voltage control logic from the processing logic. Process speed control logic on the IC is used to control the process speed of the IC in response to receiving the process speed control signal in the process speed control logic from the processing logic. Temperature control logic on the IC is used to control the temperature of the IC in response to receiving the temperature control signal in the temperature control logic from the processing logic.

These and other features and advantages of the invention will become apparent from the following description, drawings and claims.

BRIEF DESCRIPTION OF THE INVENTION

DETAILED DESCRIPTION OF THE PREFERRED EMBODIMENT

In accordance with the invention, logic is included in an IC that monitors values of parameters that may affect operation of the IC, such as, for example, supply voltage ($V_{DD}$), junction temperature ($T_{JUNC}$) and the frequency of a ring oscillator on the IC. In response to the monitored values, the logic in the IC changes, if necessary, one or more parameters such as $V_{DD}$, processor frequency ($F_{CLK}$), and/or cooling level to control the performance of the IC. Thus, the IC monitors its own environment and operating conditions and takes appropriate steps to control its environment and operating conditions to achieve certain goals.

In accordance with the preferred embodiment of the invention, the logic of the invention measures one or more of the aforementioned parameters and performs a set of prioritized algorithms that adjust one or more of the parameters in accordance with preselected priorities. From highest to lowest, the priorities may be, for example, to: (1) maintain operation of the IC within limits so as to prevent the IC from being damaged (top-level priorities), (2) maintain proper functionality of the IC (medium-level priorities), and (3) optimize energy use and operating speed of the IC according to need thermal environment and operational demand (low-level priorities).

Preferably, the IC includes fuzzy logic that executes the prioritized algorithms of the invention. The prioritized algorithms use fuzzy parameters that are classified as INPUTS or CONTROLS. The INPUTS are values representing the state of the various environmental variables that affect the IC. The CONTROLS are values that can be modified by the IC in order to continually improve the performance and energy efficiency of the IC. Thus, as the IC becomes aware of its own process speed and of its own voltage and thermal environment, the fuzzy parameter values are updated to optimize performance and energy consumption.

Figure 1:
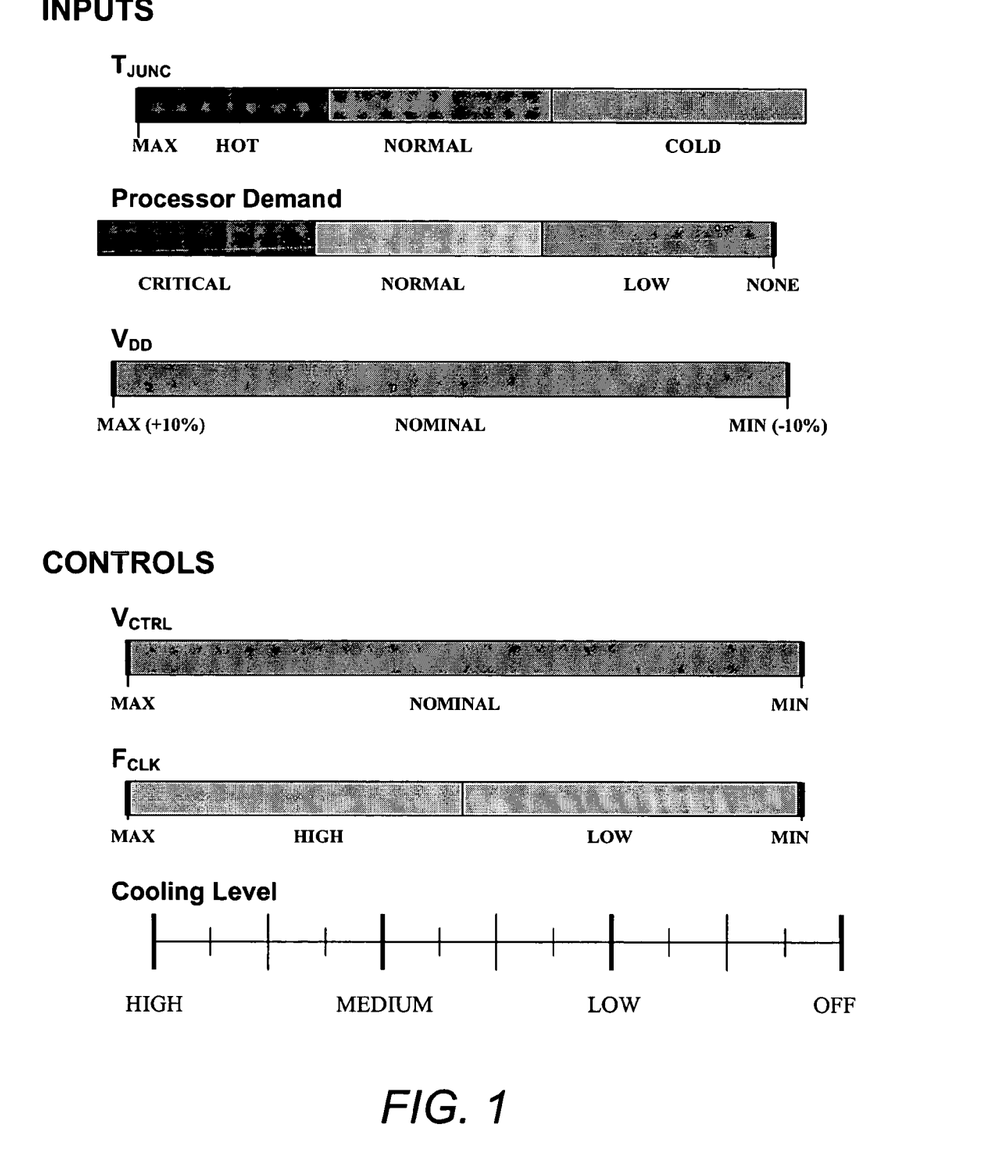
FIG. 1 is an illustration that depicts the typical parameters that will be varied to perform certain tasks in order to achieve certain priorities.

FIG. 1 is an illustration that depicts the typical parameters that will be varied to perform certain tasks in order to achieve the priorities (1)-(3). Each parameter is defined by a set of "fuzzy" variables. The fuzzy variables shown in FIG. 1 are merely examples of suitable variables that may be used to define the parameter limits and ranges. For example, the supply voltage, $V_{DD}$, is an INPUT and a CONTROL parameter defined by two limits and a fuzzy variable range, namely, "MAXIMUM", "NORMAL" and "MINIMUM". The values of MAXIMUM and MINIMUM correspond to the maximum and minimum limits, respectively, of $V_{DD}$. The value of NORMAL corresponds to a value of $V_{DD}$ or range of $V_{DD}$ values in between the MAXIMUM and MINIMUM values.

As indicated above, maintaining the level of $V_{DD}$ below the maximum $V_{DD}$ level is a top-level priority. Maintaining the level of $V_{DD}$ above the minimum $V_{DD}$ level is a medium-level priority. As described below in detail, the fuzzy logic reads the value of $V_{DD}$ and causes certain tasks to be performed in order to control the value of $V_{DD}$. For example, if the value of $V_{DD}$ is above the MAXIMUM value, the fuzzy logic causes certain tasks to be performed (e.g., lowering the IC, power supply level) in order to lower the value of $V_{DD}$ to a value that is below the value of MAXIMUM.

The junction temperature, $T_{JUNC}$, is an INPUT parameter defined by an upper limit and three fuzzy variable ranges, namely, MAXIMUM, HOT, NORMAL, and COLD. The junction temperature is measured by a thermal diode, which is a known device included today in many IC packages. The value of MAXIMUM corresponds to the maximum value for $T_{JUNC}$. The variable HOT corresponds to some range of values between the values of MAXIMUM and NORMAL. The variable NORMAL corresponds to some range of values between the values of HOT and COLD. The variable COLD corresponds to any temperature below the NORMAL range.

As indicated above, maintaining $T_{JUNC}$ at a temperature below the maximum $T_{JUNC}$ level, MAXIMUM, is another top-level priority. The fuzzy logic reads the $T_{JUNC}$ variable values and, if necessary, causes certain tasks to be performed to increase or decrease $T_{JUNC}$. As described below in detail, $T_{JUNC}$ can be increased or decreased by increasing or decreasing, respectively, either the frequency $F_{CLK}$ or the IC power supply level. For example, if the fuzzy logic determines that the value of $T_{JUNC}$ is greater than the $T_{JUNC}$ MAXIMUM value, the fuzzy logic will cause the IC to decrease the frequency $F_{CLK}$ and/or the power supply level until the fuzzy logic determines that the value of $T_{JUNC}$ is no longer above the $T_{JUNC}$ MAXIMUM.

Processor demand is another parameter that is measured and evaluated by the fuzzy logic to determine whether some action needs to be taken by the IC. This parameter corresponds to the types and quantities of processing demands that are placed on the IC microprocessor. As indicated above, the lower-level priorities relate to optimizing operational speed and energy consumption. These goals are achieved, in part, by monitoring processor demand, and as demand dictates, varying $F_{CLK}$ to vary the speed at which the IC microprocessor executes instructions. However, varying $F_{CLK}$ has an effect on the amount of energy that is consumed by the IC. Therefore, as described below in detail, several factors are taken into consideration when determining whether and by how much to vary $F_{CLK}$.

The processor-demand INPUT variable illustrated in FIG. 1 may be defined by three fuzzy variable ranges and a limit, such as, for example, HIGH, NORMAL, LOW and NONE. The HIGH variable may correspond to processing tasks that have the highest priority, such as operating system (OS) scheduling tasks. The NORMAL variable may correspond to functional mode processing tasks associated with execution of an application computer program. The LOW variable may correspond to lower priority processing tasks, such as segments of an application program that have no execution time limit. The values of these variables are measured and the frequency of the IC microprocessor clock, $F_{CLK}$, is adjusted, if necessary, to optimize performance and energy consumption.

The CONTROL parameter $F_{CLK}$ is illustrated in FIG. 1 as being defined by two limits and two fuzzy variable ranges, namely, MAXIMUM, HIGH, LOW, and MINIMUM. The MAXIMUM $F_{CLK}$ variable may correspond to the maximum clock frequency of the IC microprocessor. The MINIMUM $F_{CLK}$ variable may correspond to the minimum clock frequency of the IC microprocessor. The HIGH $F_{CLK}$ variable may correspond to an $F_{CLK}$ value that is less than $F_{CLK}$ MAXIMUM and greater than $F_{CLK}$ MINIMUM. The LOW $F_{CLK}$ variable may correspond to an $F_{CLK}$ value that is less than $F_{CLK}$ HIGH and greater than $F_{CLK}$ MINIMUM. As indicated above, the fuzzy logic will measure the values of these variables and determine the proper course of action based on the values in order to optimize performance and energy consumption.

The cooling fan CONTROL parameter shown in FIG. 1 corresponds to the case in which a cooling fan is available for use to cool the IC. As indicated above, the junction temperature, $T_{JUNC}$, can be varied by varying $F_{CLK}$ and/or the IC power supply level. If a cooling fan is available, operation of the cooling fan may be controlled in conjunction with, or in lieu of, controlling the $F_{CLK}$ or the power supply in order to control $T_{JUNC}$. The cooling fan CONTROL settings are listed in FIG. 1 as HIGH, MEDIUM, LOW and OFF. The HIGH value corresponds to the highest setting of the fan. The LOW value corresponds to the lowest setting of the fan. The MEDIUM value corresponds to a setting in between HIGH and LOW. The OFF value corresponds to the fan being in the off setting.

As described below in detail, the value of the cooling fan CONTROL parameter may be read by the fuzzy logic, which will then cause one or more tasks to be performed. For example, if $T_{JUNC}$ is at $T_{JUNC}$ HOT and the cooling fan is set to LOW, then the fuzzy logic may cause the cooling fan setting to be increased to MEDIUM. In addition to changing the cooling fan setting, the fuzzy logic may cause the power supply to be slightly decreased, e.g., to a level that causes $V_{DD}$ to be decreased to a NORMAL value at the lower end of the NORMAL range.

All of these fuzzy variable values may be varied before, after or during execution of the prioritization algorithm in order to improve performance and optimize energy consumption. Some fuzzy variable values will typically be application-specific, and thus will need to have suitable values for a particular application. For example, the types of processing tasks that are of NORMAL and LOW priority will typically be defined for each application. Similarly, a processing task that is defined as being of LOW priority prior to run-time may be redefined at run-time as being of NORMAL priority. As another example, if, during the execution of an application program by the IC, the fuzzy logic determines that the initial value of the $F_{CLK}$ HIGH is too low, the value of $F_{CLK}$ HIGH can be increased by the fuzzy logic during execution of the program.

Figure 2:
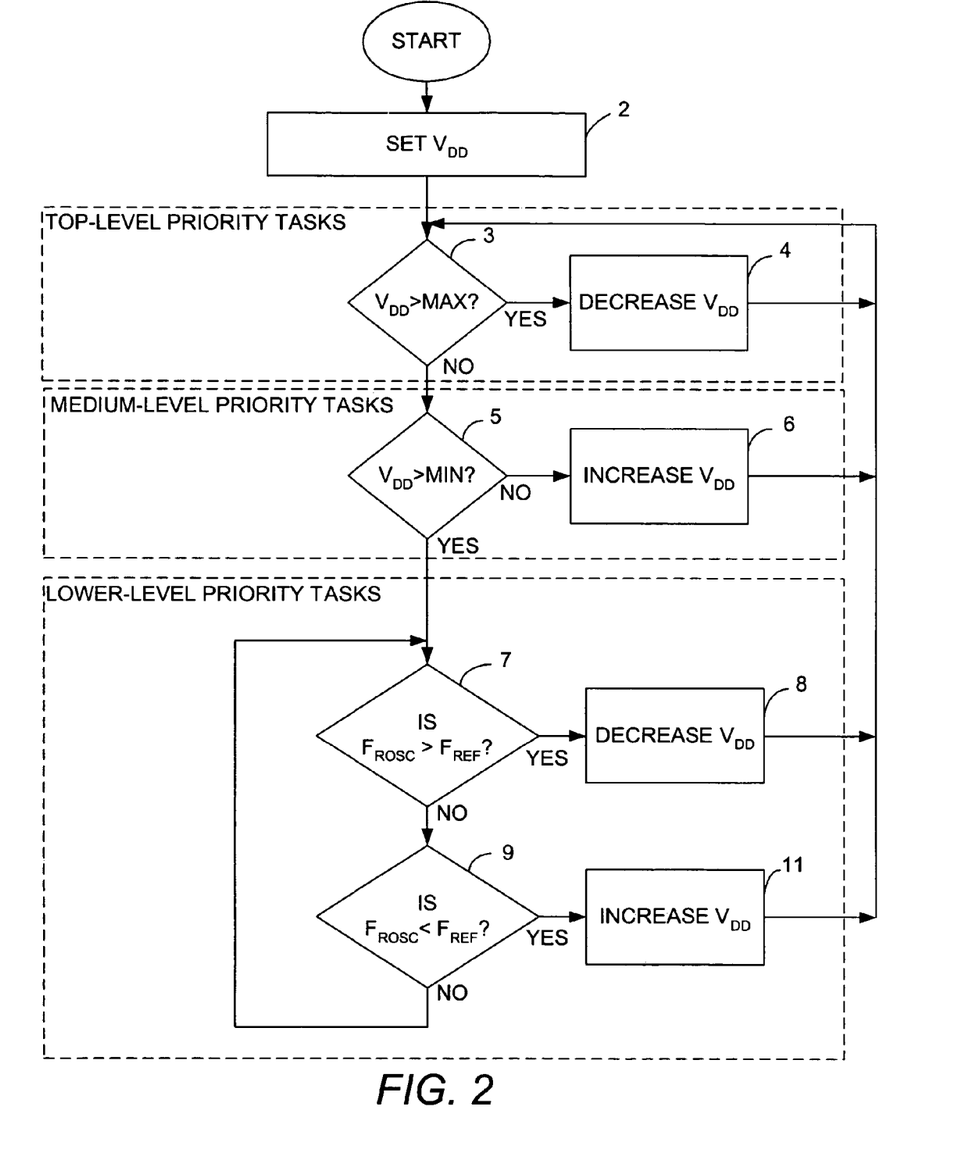
FIG. 2 illustrates a flow chart that represents certain tasks performed by a prioritized algorithm using parameters shown in FIG. 1.
Figure 3:
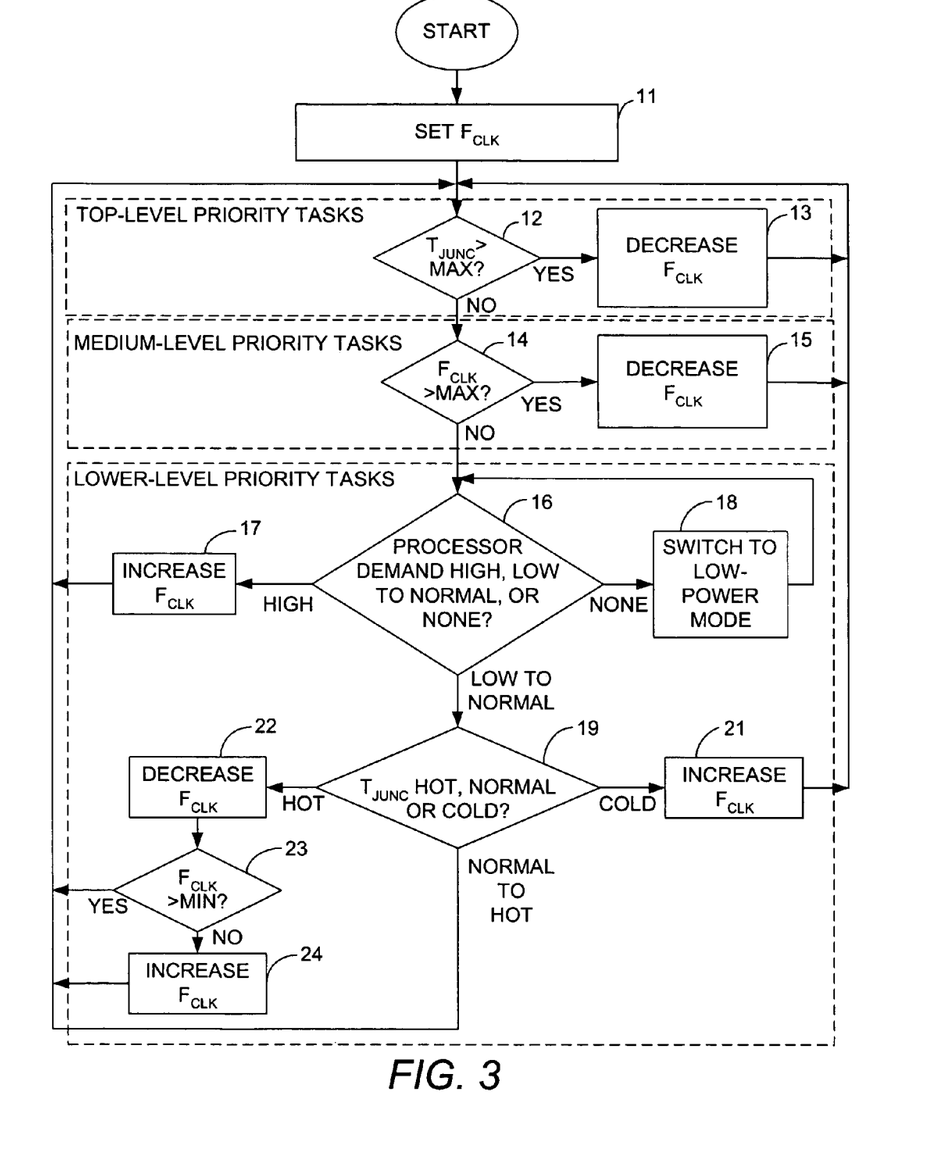
FIG. 3 illustrates a flow chart that represents certain tasks performed by a prioritized algorithm using parameters shown in FIG. 1.

FIG. 2 illustrates a flow chart that represents certain tasks performed by a prioritized algorithm using parameters shown in FIG. 1 to achieve priorities (1)-(3). Likewise, FIG. 3 illustrates a flow chart that represents certain tasks performed by a prioritized algorithm using parameters shown in FIG. 1 to achieve priorities (1)-(3). The tasks shown in FIGS. 2 and 3 will typically be performed in parallel by one or more processors of the IC. FIGS. 2 and 3 both show the performance of top-level priority tasks, medium-level priority tasks and lower-level priority tasks.

As stated above, the top-level priority is to maintain operation of the IC within limits so as to prevent the IC from being damaged. In accordance with this exemplary embodiment of the invention, the top-level priority is accomplished by maintaining the supply voltage $V_{DD}$ below $V_{DD}$ MAXIMUM and by maintaining the junction temperature $T_{JUNC}$ below its $T_{JUNC}$ MAXIMUM. The parameters $V_{DD}$ and $F_{CLK}$ will typically be initialized at the start of execution the algorithm, as indicated by blocks 2 and 11 in FIGS. 2 and 3, respectively. These initial values may be nominal values, i.e., in the middle of the operating range.

A determination is made at block 3 (FIG. 2) as to whether the value of $V_{DD}$ is greater than $V_{DD}$ MAXIMUM. If so, one or more parameters are varied to decrease $V_{DD}$, as indicated by block 4. As stated above, $V_{DD}$ will typically be decreased by decreasing the power supply setting for the IC, as described in detail below with reference to FIG. 4. Because it is a top priority to ensure that $V_{DD}$ is not above the maximum $V_{DD}$ limit, the process then returns to block 3 to determine whether $V_{DD}$ has been increased above the maximum $V_{DD}$ limit.

With reference to FIG. 3, a determination is made at block 12 as to whether the value of $T_{JUNC}$ is greater than $T_{JUNC}$ MAXIMUM. If so, $F_{CLK}$ is decreased in order to decrease $T_{JUNC}$, as indicated by block 13. The manner in which this may be accomplished is described below with reference to FIG. 6. However, as stated above, a cooling fan may also be used to control $T_{JUNC}$, as described below in detail with reference to FIG. 5.

The process then returns to block 12 (FIG. 3) in order to determine whether $T_{JUNC}$ is above $T_{UNC}$ MAXIMUM. If the results of the decisions represented by blocks 3 and 12 are that $V_{DD}$ is not greater than the maximum $V_{DD}$ limit and that $T_{JUNC}$ is not greater than the maximum $T_{JUNC}$ limit, then the parallel processes proceed to blocks 5 and 14 in FIGS. 2 and 3, respectively. Blocks 5 and 14 represent medium-level priority tasks, which are also performed in parallel. The purpose of performing the medium-level priority tasks is to maintain proper functionality of the IC by maintaining $V_{DD}$ above a minimum $V_{DD}$ limit, and by maintaining the microprocessor clock frequency, $F_{CLK}$, below a maximum reference clock frequency. Of course, if $V_{DD}$ is too low, the IC will not operate properly. Likewise, if $F_{CLK}$ is too low, the IC will not operate properly. The manner in which the real-time $F_{CLK}$ value may be measured and, if deemed appropriate, varied is described below with reference to FIG. 6.

If a determination is made at block 5 (FIG. 2) that $V_{DD}$ is not greater than the minimum $V_{DD}$ limit, then the power supply level is increased, thereby causing $V_{DD}$ to be increased, as indicated by block 6 (FIG. 2). The process then returns to the block 3 (FIG. 2) to determine whether $V_{DD}$ is above $V_{DD}$ MAXIMUM. If a determination is made at block 14 (FIG. 3) that $F_{CLK}$ is not less than $F_{CLK}$ MAXIMUM, then one or more parameters are varied to decrease $F_{CLK}$, as indicated by block 15 (FIG. 3). The process then returns to block 12 (FIG. 3) to determine whether $T_{JUNC}$ is greater than the $T_{JUNC}$ MAXIMUM.

It should be noted from the above description of blocks 3 6 in FIG. 2 and 12-14 in FIG. 3 that the tasks associated with the medium-level priorities are not taken into account until the top-level priority tasks have been performed. In addition, as described above, while the medium-level priority, tasks are being performed, the top-level priority tasks are also being performed. Once the top-level and medium-level priority tasks have been performed, lower-level priority tasks are performed. In addition, while the lower-level priority tasks are being performed, the top-level and medium-level priority tasks are also being performed, as described below in more detail.

The main purpose of the lower-level priorities is to optimize performance and energy consumption. Blocks 7-11 shown in FIG. 2 represent lower-level priority tasks that are accomplished by either increasing or decreasing $V_{DD}$ based on the measured difference between the frequency, $F_{REF}$, of the IC reference clock, $CLK_{REF}$, and the frequency, $F_{ROSC}$, of a ring oscillator output signal, $CLK_{ROSC}$. Because the ring oscillator is located on the IC, the frequency of the ring oscillator is proportional to the operation speed of the IC. Thus, by measuring the frequency of the ring oscillator, and comparing the frequency of the ring oscillator with $CLK_{REF}$, which is fixed, a measure of the operational speed of the IC is obtained. A circuit for measuring the difference between the frequency of $CLK_{REF}$ and the frequency of the ring oscillator output signal is described below with reference to FIG. 4.

With reference again to FIG. 2, a decision is made as to whether the frequency of the ring oscillator output signal is greater than or equal to the frequency of $CLK_{REF}$, as indicated by block 7. If so, the power supply level is decreased in order to decrease $V_{DD}$, as indicated by block 8. If not, a decision is made by block 9 as to whether the frequency of the ring oscillator output signal is less than $CLK_{REF}$. If not, the process returns to block 7. If so, the power supply level is increased in order to increase $V_{DD}$, as indicated by block 11. The process then returns to block 3 to ensure that the top-level priorities continue to be met.

Figure 4:
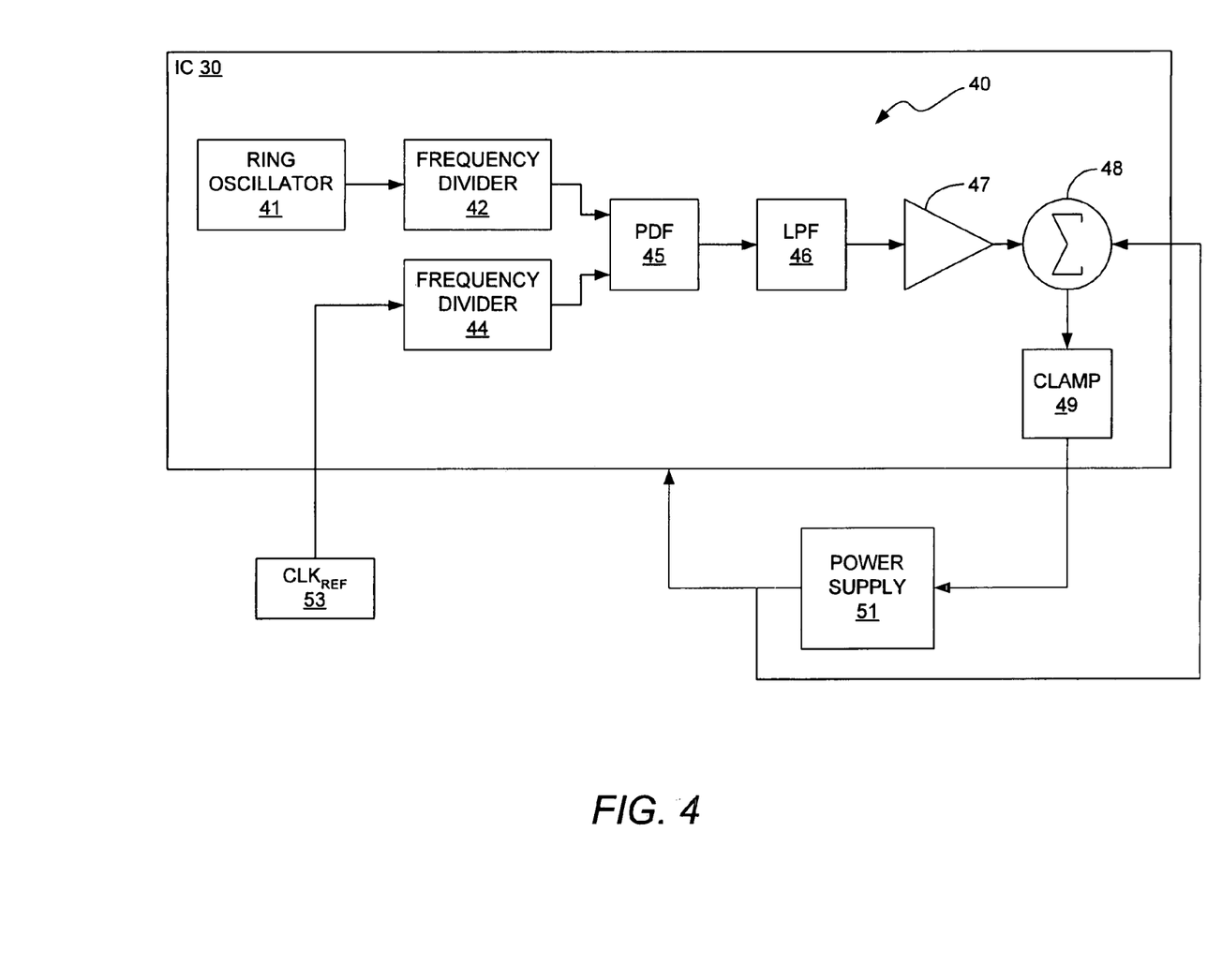
FIG. 4 illustrates a block diagram of a feedback-based, delay-stabilization circuit of an IC that forces the IC toward or to its nominal operating point.

Prior to describing the lower-level priority tasks shown in FIG. 3, the manner in which the difference between the frequency $F_{REF}$ of $CLK_{REF}$ and the frequency $F_{ROSC}$ of the ring oscillator output signal is measured will be described with reference to FIG. 4. FIG. 4 illustrates a block diagram of a feedback-based, delay-stabilization circuit 40 of an IC 30 that forces the IC 30 toward or to its nominal operating point. The circuit 40 monitors the frequency ($F_{ROSC}$) of a signal output from a ring oscillator 41 and adjusts the power supply 51 in response to a change in the frequency ($F_{ROSC}$) of the signal output from the ring oscillator 41 in order to control $V_{DD}$ and/or $T_{JUNC}$. Thus, the circuit 40 shown in FIG. 4 can be used to accomplish the lower-level priority tasks represented by blocks 7-11 in FIG. 2.

The circuit 40 includes the ring oscillator 41, one or more frequency dividers 42 and 44, a phase-frequency detector (PFD) 45, a low-pass filter (LPF) 46, a biasing block 47, a signal combining block 48, and a clamp 49, all of which are described below in greater detail. The circuit 40 is disclosed in U.S. Pat. No. 6,930,521B2, issued on Aug. 16, 2005, which is incorporated herein by reference herein in its entirety.

As stated above, because the ring oscillator 41 is disposed on the IC 30, the frequency $F_{ROSC}$ of the signal output from the ring oscillator 41 is proportional to the operating speed of the IC 30. The ring oscillator 41 is designed such that its output signal has a nominal value when the IC 30 is operating at its nominal operating point, i.e., when the parameters such as supply voltage, temperature, and gate-oxide thickness are all at their nominal values. However, if these operating parameters are, on average, skewed toward a best-case operating condition, then the frequency of the signal output from the ring oscillator 41 is higher than the nominal value, which indicates that the IC 30 is operating "faster" than nominal. Conversely, if these parameters are, on average, skewed toward a worst-case operating condition, then the frequency of the signal output from the ring oscillator 41 is lower than the nominal value, which indicates that the IC 30 is operating "slower" than nominal. Therefore, the frequency of the signal output from the ring oscillator 41 provides a noninvasive measurement of the operating point of the IC 30.

As the operating point of the IC 30 fluctuates due to changes in the operating parameters, the frequency $F_{ROSC}$ of the signal output from the ring oscillator 41 changes, thus tracking the fluctuations in the operating point. For example, if $T_{JUNC}$ rises or $V_{DD}$ falls, then the frequency $F_{ROSC}$ of the oscillator signal will decrease, thus indicating the slower operation of the IC 30. Conversely, if $T_{JUNC}$ falls or $V_{DD}$ rises, then the frequency $F_{ROSC}$ of the oscillator signal will increase, thus indicating the faster operation of the IC 30. The feedback circuit 40 controls the supply voltage to the IC 30 so as to drive the frequency $F_{ROSC}$ of the signal output from the ring oscillator 41 toward its nominal value, thereby causing the IC 30 to be driven toward its nominal operating point.

Specifically, a reference clock generator 53, which is external to the IC 30, generates a $CLK_{REF}$ signal having a frequency $F_{REF}$ that is close to the nominal frequency of the ring oscillator 41. Alternatively, if the generator 53 does not generate the reference clock having the nominal frequency of the oscillator 41, then one or both of the frequency dividers 42 and 44 may be programmed so that the generator 53 effectively generates the reference clock having the nominal frequency. For example, if the nominal frequency is 100 MHz, but the generator 53 generates a 200 MHz reference clock, then the divider 44 can be programmed to divide the frequency of the reference clock by two in order to obtain the nominal frequency of 100 MHz.

The outputs of the ring oscillator 41 and the reference-clock generator 53 (possibly divided by the frequency dividers 42 and 44) are fed into the PFD 45, which generates a binary up/down voltage error signal that signifies which of the two frequencies is higher. The LPF 46 smoothens the voltage error signal to set the bandwidth of the feedback loop formed by the circuit 40 and the power supply 51. The resulting filtered signal is then typically input to a biasing block 47 that limits and/or otherwise adjusts the error signal. For example, the error signal, if left unbiased, may cause the power supply 51 to provide a supply voltage $V_{DD}$ that is higher than what the IC 30 can tolerate. Circuitry within the biasing block 47 limits the supply voltage to an acceptable level. In addition, the biasing block 47 may be used to manipulate the error signal to a magnitude-based error signal or a percentage-based error signal.

The biased error signal is input to a signal combiner 48, which combines the error signal with the supply voltage output from the power supply 51. If the error signal is a magnitude-based error signal, then the two inputs to the combiner 48 are summed, as is shown in FIG. 4. If the error signal is a percentage-based error signal, the combiner 48 will be replaced with a multiplier (not shown) that multiplies the two inputs together.

Once the supply voltage $V_{DD}$ output from the power supply 51 has been adjusted to a level that results in nominal operation of the IC 30, the frequency of the signal output from the ring oscillator 41 will have the nominal value, i.e., the same frequency as $CLK_{REF}$, thus stabilizing the IC 30 at its nominal operating point.

It should be noted that the circuit 40 shown in FIG. 4 and described above is one example of a circuit that is suitable for performing the lower-level priority tasks shown in FIG. 2. Other circuit configurations can be used to perform these tasks, as will be understood by persons skilled in the art in view of the description provided herein.

While the lower-level priority tasks represented by blocks 7-11 in FIG. 2 are being performed, the lower-level priority tasks represented by blocks 16-24 in FIG. 3 preferably are also being performed, i.e., the processes are performed in parallel. Blocks 16-24 shown in FIG. 3 represent lower-level priority tasks that are accomplished by either increasing or decreasing the internal processor clock, $F_{CLK}$, in order to optimize performance and energy consumption. The internal processor clock $F_{CLK}$ generally is derived by using one or more frequency dividers (not shown) to divide $F_{REF}$ into a lower frequency. The manner in which $F_{CLK}$ is increased and decreased is described below with reference to FIG. 6.

A determination is made at block 16 as to whether processor demand is HIGH, LOW to NORMAL or NONE. If a determination is made that processor demand is HIGH, e.g., that a number of critical processing tasks or a large number of normal tasks are waiting to be performed, then $F_{CLK}$ is increased, as indicated by block 17. The process then returns to block 12 to ensure that the top-level and medium-level priorities continue to be met. If a determination is made at block 16 that demand is NONE, i.e., that no tasks are waiting to be performed, the IC switches itself to a power-save mode. In the power save mode, $F_{CLK}$ is decreased to a minimum acceptable level such that the IC conserves power. The process then returns to block 16.

If a determination is made at block 16 that processor demand is between LOW and NORMAL, e.g., non-critical processing tasks are waiting to be executed, then the process proceeds to block 19. At block 19, a determination is made as to whether the value of $T_{JUNC}$ is HOT, COLD or NORMAL. If it is determined that the value of $T_{JUNC}$ is between NORMAL and HOT, the process returns to block 12. If it is determined that the value of $T_{JUNC}$ is COLD, then $F_{CLK}$ is increased, as indicated by block 21. The process then returns to block 12. If the value of $T_{JUNC}$ is not less than HOT, then the process returns to block 16. If a determination is made at block 19 that the value of $T_{JUNC}$ is HOT, then $F_{CLK}$ is decreased, as indicated by block 22. A determination is then made as to whether $F_{CLK}$ is greater than $F_{CLK}$ MINIMUM, as indicated by block 23. If so, the process returns to block 12. If not, $F_{CLK}$ is increased, as indicated by block 24. The process then returns to block 12.

The above description of blocks 16-24 demonstrates that a tradeoff exists between processing speed, i.e., $F_{CLK}$, and power consumption. The goal of the lower-level priority tasks is to increase $F_{CLK}$ when processor demand is high and to decrease $F_{CLK}$ in order to reduce power consumption when processor demand decreases. The top-level and medium-level priorities are also taken into consideration as the lower-level priorities are being considered to ensure that increasing $F_{CLK}$ does not result in an increase in $T_{JUNC}$ above $T_{JUNC}$ MAXIMUM (blocks 12 and 13), or in an increase in $F_{CLK}$ above $F_{CLK}$ MAXIMUM (blocks 14 and 15).

Figure 5:
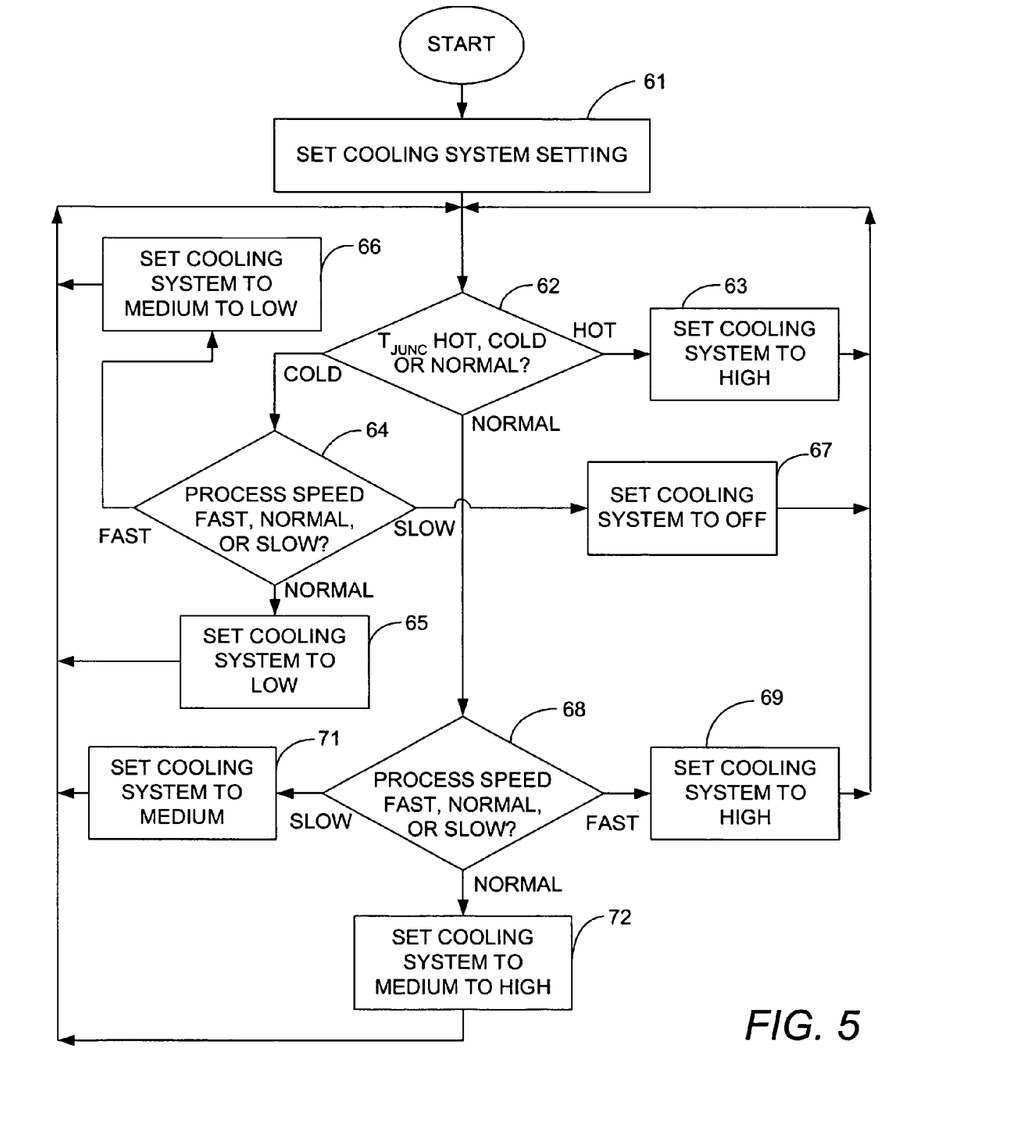
FIG. 5 illustrates a flow chart that represents an algorithm for controlling the temperature of the IC.

As indicated above with reference to FIG. 1, the value of $T_{JUNC}$ can also be reduced by using some type of cooling system, such as a cooling fan, for example. FIG. 5 illustrates a flow chart that represents an algorithm that can be performed either separate from or in conjunction with the portion of the algorithm represented by blocks 16-24 in FIG. 3. As shown in FIG. 5, at the beginning of execution of the algorithm the cooling system is set to some initial setting, as indicated by block 61. The initial setting will typically be some nominal setting that has been determined to by a suitable setting for most conditions, e.g., low. A determination is made at block 62 as to whether the value of $T_{JUNC}$ is HOT, COLD or NORMAL. If the value of $T_{JUNC}$ is in the HOT range, the cooling system is set to HIGH, as indicated by block 63. The process then returns to block 62.

If the value of $T_{JUNC}$ is determined at block 62 to be in the NORMAL range, the process proceeds to block 68 at which a determination is made as to whether the process speed is FAST, SLOW or NORMAL. The process speed is a variable that is dependent on the value of $V_{DD}$. As described above with reference to FIG. 4, the ring oscillator 41 outputs a signal having a frequency $F_{ROSC}$ that is proportional to the operating, or process, speed of the IC. Because the power supply is varied in order to vary the frequency of the signal that is output from the ring oscillator 41, the value of $V_{DD}$ is proportional to the process speed and can be used in a straightforward manner to determine the process speed of the IC.

If it is determined at block 68 that the process speed is FAST, the cooling system is set to HIGH, as indicated by block 69. The process then returns to block 62. If it is determined at block 68 that the process speed is SLOW, then the cooling system is set to MEDIUM, as indicated by block 71. The process then returns to block 62. It is determined at block 68 that the process speed is NORMAL, then the cooling system is set to MEDIUM to HIGH, as indicated by block 72. T he process then returns to block 62.

If the value of $T_{JUNC}$ is determined at block 62 to be in the COLD range, the process proceeds to block 64 at which a determination is made as to whether the process speed is FAST, SLOW or NORMAL. If it is determined at block 64 that the process speed is FAST, the cooling system is set to MEDIUM to LOW, as indicated by block 66. The process then returns to block 62. If it is determined at block 64 that the process speed is SLOW, then the cooling system is set to OFF, as indicated by block 67. The process then returns to block 62. It is determined at block 64 that the process speed is NORMAL, then the cooling system is set to LOW, as indicated by block 65. The process then returns to block 62.

Figure 6:
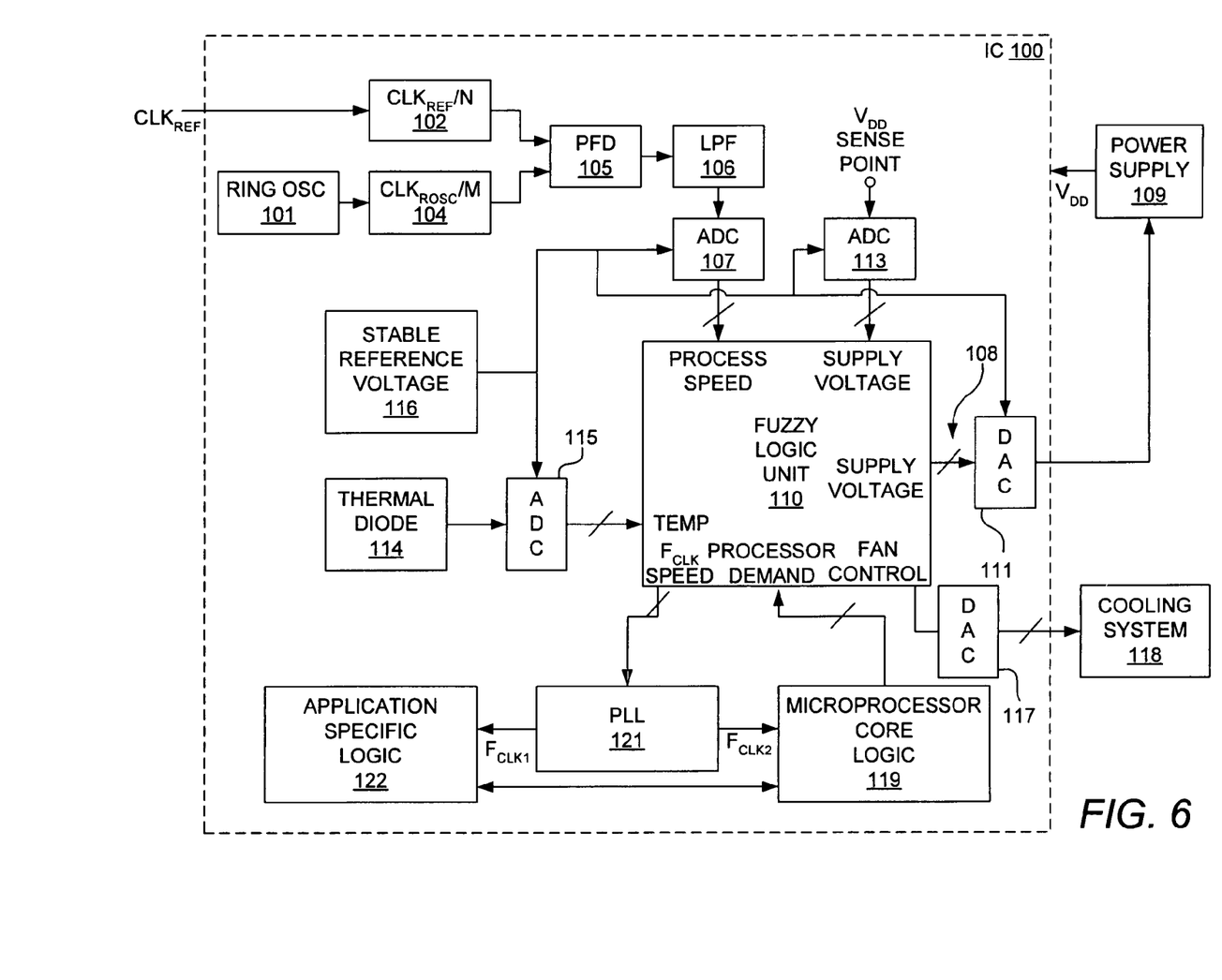
FIG. 6 illustrates a block diagram of an IC having a fuzzy logic unit in accordance with the invention for performing the algorithms of the invention described above with reference to FIGS. 2-5.

FIG. 6 illustrates a block diagram of an IC 100 having a fuzzy logic unit 110 for performing the algorithms of the invention described above with reference to FIGS. 2-5. The components 101-106 may be identical to components 41-46, respectively, shown in FIG. 4. The output of the LPF 106 is a lowpass-filtered signal having an analog value that corresponds to the difference between the frequency of the signal output from the ring oscillator 101 and the frequency of the reference clock signal $CLK_{REF}$. The signal output from the LPF 106 is converted by an analog-to-digital converter (ADC) 107 into a multi-bit digital signal having a digital value that corresponds to the difference between the frequency of the signal output from the ring oscillator 101 and the frequency of the reference clock signal $CLK_{REF}$. The fuzzy logic unit 110 processes this signal and generates a multi-bit digital signal having a value that, when converted into an analog signal, corresponds to a level to which the power supply 109 is to be set in order to cause $V_{DD}$ to be adjusted to a value that will cause the difference between the frequencies of the ring oscillator output signal to be driven toward zero. The fuzzy logic unit 110 also processes the signal output from ADC 107 to obtain an indication of process speed, which is used by the fuzzy logic unit 110 to perform the algorithm described above with reference to FIG. 5.

The digital signal 108 is converted by a digital-to-analog converter (DAC) 109 into an analog signal that is output to the power supply 109 to set the level of the power supply 109. The power supply 109 then outputs the corresponding reference voltage signal $V_{DD}$ to the IC 100. The current level of $V_{DD}$ is sensed at some location on the IC 100 by an ADC 113, which converts the analog voltage signal into a multi-bit digital signal that is processed by the fuzzy logic unit 110 to perform the tasks described above with reference to FIG. 2.

A thermal diode 114 measures the junction temperature $T_{JUNC}$ of the IC 100 and generates an analog voltage signal having a value that is proportional to the value of $T_{JUNC}$. An ADC 115 converts the analog signal into a multi-bit digital signal that is received and processed by the fuzzy logic unit 110 to perform the tasks described above with reference to FIGS. 3 and 5. A stable reference voltage device 116 supplies the ADCs 107, 113 and 115 and the DAC 111 with a stable reference voltage that does not vary with variations in process, temperature and/or supply voltage.

The fuzzy logic unit 110 processes the process speed and $T_{JUNC}$ values in accordance with an algorithm such as that described above with reference to FIG. 5 and produces a multi-bit digital signal, which, when converted by DAC 117 into an analog voltage signal, corresponds to the setting of a cooling system 118 that will be used to cool the IC 100.

The fuzzy logic unit 110 receives an indication of the processor demand from the microprocessor core logic 119 of the IC 100. The indication may be, for example, a two-bit signal with 00 corresponding to no demand, 01 corresponding to low demand, 10 corresponding to normal demand, and 11 corresponding to high demand. The fuzzy logic unit 110 processes the processor demand indication along with the $T_{JUNC}$ value received from ADC 115 in accordance with the algorithms described above with reference to FIGS. 3 and 5.

The fuzzy logic unit 110 processes the $T_{JUNC}$ value and processor demand indication in the manner described above with reference to FIG. 3 to obtain a speed indication of how much, if any, to vary $F_{CLK}$. This indication is output to a phase-locked loop (PLL) 121, which varies the frequency of a reference clock signal provided to the PLL 121 to generate $F_{CLK}$. In FIG. 6, two clock signals are shown for exemplary purposes, namely, $F_{CLK1}$, which is used by the application specific logic 122 of the IC 100 that performs application tasks, and $F_{CLK2}$, which is used by the microprocessor core logic 119.

It should be noted that the invention has been described above with reference to exemplary embodiments and that the invention is not limited to the exemplary embodiments described herein. The invention is not limited to using the parameters and fuzzy variables described above with reference to FIG. 1. In addition, the invention is not limited to the prioritization algorithms described above with reference to FIGS. 2, 3 and 5, or to the logic configuration described above with reference to FIGS. 4 and 6. Those skilled in the art will understand, in view of the description provided herein, that many variations may be made to the embodiments described above with reference to FIGS. 1-6, and that all such variations are within the scope of the invention.

What is claimed is:

1. An apparatus for monitoring and controlling environmental and operating conditions of an integrated circuit (IC) in which the apparatus is located, the apparatus comprising:
   supply voltage measurement logic configured to measure a supply voltage of the IC;
   process speed measurement logic configured to measure a process speed of the IC;
   temperature measurement logic configured to measure a temperature of the IC;
   processing logic configured to receive respective indications of the supply voltage, the process speed and the temperature from the measurement logic and to process the indications to generate a supply voltage control signal, a process speed control signal, and a temperature control signal;
   supply voltage control logic configured to control the supply voltage of the IC in response to receiving the supply voltage control signal from the processing logic;
   process speed control logic configured to control the process speed of the IC in response to receiving the process speed control signal from the processing logic; and
   temperature control logic configured to control the temperature of the IC in response to receiving the temperature control signal from the processing logic,
   wherein the processing logic includes fuzzy logic that processes the respective indications in accordance with a prioritization algorithm that generates control signals that control the supply voltage, process speed and temperature of the IC to prevent damage to the IC while maintaining proper functionality of the IC.

2. The apparatus of claim 1, wherein the prioritization algorithm prevents damage to the IC by generating a control signal that controls the supply voltage to prevent the supply voltage of the IC from exceeding a maximum limit, and a control signal that controls the temperature of the IC to prevent the temperature from exceeding a maximum limit.

3. The apparatus of claim 2, wherein the prioritization algorithm maintains proper functionality of the IC by decreasing a frequency of a clock signal used by a processor of the IC to perform processing when a determination is made by said processing logic that the frequency of said clock signal has exceeded a maximum limit.

4. The apparatus of claim 3, wherein said processing logic receives an indication of a processor demand corresponding to an amount or type of processing tasks to be performed by said processor of the IC, and wherein the prioritization algorithm optimizes performance of the IC by increasing said frequency of said clock signal when the supply voltage and temperature are below the respective maximum limits.

5. The apparatus of claim 4, wherein the prioritization algorithm optimizes energy use by the IC by decreasing said frequency of said clock when the indication of processor demand indicates a decrease in processor demand has occurred.

6. The apparatus of claim 5, wherein the prioritization algorithm optimizes energy use by the IC by decreasing said frequency of said clock to a minimum limit when the indication of processor demand indicates that there is no processor demand.

7. The apparatus of claim 5, wherein the prioritization algorithm optimizes performance of the IC by increasing the supply voltage when the supply voltage, temperature and frequency of said clock signal are below the respective maximum limits and temperature is significantly below the maximum limit for temperature.

8. The apparatus of claim 5, wherein the prioritization algorithm optimizes energy use by the IC by decreasing the supply voltage when the process speed is above a particular level.

9. The apparatus of claim 5, wherein the temperature control logic controls the temperature by controlling a setting of a cooling system, and wherein the prioritization algorithm optimizes energy use by the IC by setting the cooling system to decrease the temperature of the IC when the indication of temperature indicates that the temperature is sufficiently high.

10. The apparatus of claim 5, wherein the temperature control logic controls the temperature by controlling a setting of a cooling system, and wherein the prioritization algorithm optimizes energy use by the IC by setting the cooling system to decrease the temperature of the IC when the indication of process speed indicates that the process speed is sufficiently fast.

11. The apparatus of claim 5, wherein the temperature control logic controls the temperature by controlling a setting of a cooling system, and wherein the prioritization algorithm optimizes performance of the IC by setting the cooling system to a higher setting that will allow the temperature of the IC to increase when the indication of temperature indicates that the temperature is sufficiently low.

12. The apparatus of claim 5, wherein the temperature control logic controls the temperature by controlling a setting of a cooling system, and wherein the prioritization algorithm optimizes performance of the IC by setting the cooling system to a higher setting that will allow the temperature of the IC to increase when the indication of process speed indicates that the process speed is sufficiently slow.

13. A method for measuring and controlling environmental and operating conditions of an integrated circuit (IC), the method comprising:
   using supply voltage measurement logic on the IC to measure a supply voltage of the IC;
   using process speed measurement logic on the IC to measure a process speed of the IC;
   using temperature measurement logic on the IC to measure a temperature of the IC;
   in processing logic of the IC, receiving respective indications of the supply voltage, the process speed and the temperature from the measurement logic;
   processing the indications in the processing logic to generate a supply voltage control signal, a process speed control signal, and a temperature control signal;
   using supply voltage control logic on the IC to control the supply voltage of the IC in response to receiving the supply voltage control signal in the supply voltage control logic from the processing logic;
   using process speed control logic on the IC to control the process speed of the IC in response to receiving the process speed control signal in the process speed control logic from the processing logic; and using temperature control logic on the IC to control the temperature of the IC in response to receiving the temperature control signal in the temperature control logic from the processing logic, wherein the processing logic includes fuzzy logic that processes the respective indications in accordance with a prioritization algorithm that generates respective control signals that control the supply voltage, process speed and temperature of the IC to prevent damage to the IC while maintaining proper functionality of the IC.

14. The method of claim 13, wherein the prioritization algorithm prevents damage to the IC by controlling the supply voltage to prevent the supply voltage of the IC from exceeding a maximum limit, and by controlling the temperature of the IC to prevent the temperature from exceeding a maximum limit.

15. The method of claim 14, wherein the prioritization algorithm maintains proper functionality of the IC by decreasing a frequency of a clock signal used by a processor of the IC to perform processing when a determination is made by said processing logic that the frequency of said clock signal has exceeded a maximum limit.

16. The method of claim 15, wherein said processing logic receives an indication of a processor demand corresponding to an amount or type of processing tasks to be performed by said processor of the IC, and wherein the prioritization algorithm optimizes performance of the IC by increasing said frequency of said clock signal when the supply voltage and temperature are below the respective maximum limits.

17. The method of claim 16, wherein the prioritization algorithm optimizes energy use by the IC by decreasing said frequency of said clock when the indication of processor demand indicates a decrease in processor demand has occurred.

18. The method of claim 17, wherein the prioritization algorithm optimizes energy use by the IC by decreasing said frequency of said clock to a minimum limit when the indication of processor demand indicates that there is no processor demand.

19. The method of claim 17, wherein the prioritization algorithm optimizes performance of the IC by increasing the supply voltage when the supply voltage, temperature and frequency of said clock signal are below the respective maximum limits and temperature is significantly below the maximum limit for temperature.

20. The method of claim 17, wherein the prioritization algorithm optimizes energy use by the IC by decreasing the supply voltage when the process speed is above a particular level.

21. The method of claim 17, wherein the temperature control logic controls the temperature by controlling a setting of a cooling system, and wherein the prioritization algorithm optimizes energy use by the IC by setting the cooling system to decrease the temperature of the IC when the indication of temperature indicates that the temperature is sufficiently high.

22. The method of claim 17, wherein the temperature control logic controls the temperature by controlling a setting of a cooling system, and wherein the prioritization algorithm optimizes energy use by the IC by setting the cooling system to decrease the temperature of the IC when the indication of process speed indicates that the process speed is sufficiently fast.

23. The method of claim 17, wherein the temperature control logic controls the temperature by controlling a setting of a cooling system, and wherein the prioritization algorithm optimizes performance of the IC by setting the cooling system to a higher setting that will allow the temperature of the IC to increase when the indication of temperature indicates that the temperature is sufficiently low.

24. The method of claim 17, wherein the temperature control logic controls the temperature by controlling a setting of a cooling system, and wherein the prioritization algorithm optimizes performance of the IC by setting the cooling system to a higher setting that will allow the temperature of the IC to increase when the indication of process speed indicates that the process speed is sufficiently slow.

* * * * *